(No Model.)

J. A. ROUSSEAU.
PNEUMATIC TIRE FOR BICYCLES.

No. 567,512.   Patented Sept. 8, 1896.

WITNESSES
A. N. Pomroy.
C. G. Graydon.

INVENTOR
Joseph A. Rousseau
By his Att'y
Henry W. Williams

UNITED STATES PATENT OFFICE.

JOSEPH A. ROUSSEAU, OF FALL RIVER, MASSACHUSETTS.

PNEUMATIC TIRE FOR BICYCLES.

SPECIFICATION forming part of Letters Patent No. 567,512, dated September 8, 1896.

Application filed June 13, 1896. Serial No. 595,383. (No model.)

*To all whom it may concern:*

Be it known that I, JOSEPH A. ROUSSEAU, a citizen of the United States, residing in Fall River, in the county of Bristol and State of Massachusetts, have invented new and useful Improvements in Pneumatic Tires for Bicycles and other Vehicles, of which the following is a specification.

This invention has for its object to produce a pneumatic tire which cannot easily be disabled by being punctured by nails, tacks, or other sharp objects, and whose efficiency is not impaired by the improved construction whereby it is rendered practically non-puncturable.

My improvement comprises a tube of substantially pure rubber, an inner base or stiffening portion of soft rubber made comparatively thick and extending across the tread and up to points substantially opposite the edges of the rim, and curved aluminium plates applied between the tube and the inner soft-rubber portion during the process of molding, said plates being arranged in pairs and the two plates constituting each pair being hinged together and set on the inner surface of the tube next the tread and having their outer surfaces formed with depressions or serrations, all as below described and illustrated in the accompanying drawings, in which—

Figure 1:
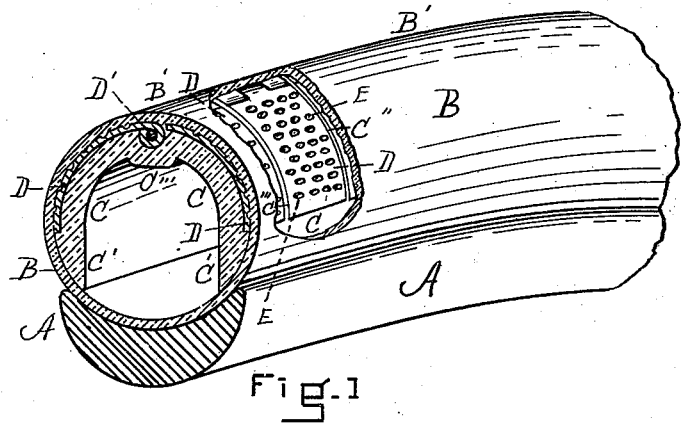
Figure 2:
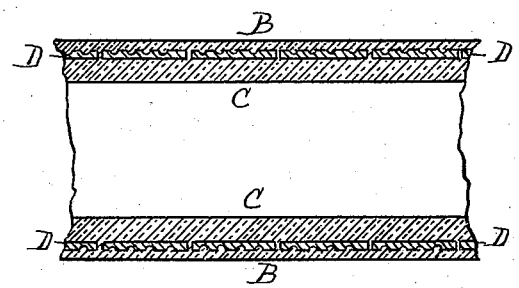
Figure 3:
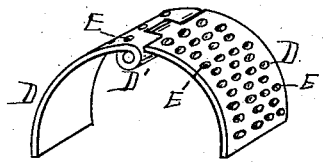

Figure 1 is a section and elevation of a portion of a pneumatic tire embodying my invention, said tire being applied to a rim or felly and having a portion represented as broken out in order to show the arrangement of the hinged plates therein. Fig. 2 is a horizontal section of the same. Fig. 3 is a view in perspective of a pair of the hinged plates removed.

Similar letters of reference indicate corresponding parts.

A represents an ordinary bicycle-rim, and B a rubber tube secured to the rim in the ordinary manner.

C is a thick piece of soft rubber placed within the tube and extending from the tread portion B' therein to points substantially opposite the opposite edges of the rim.

D D represent pairs of curved plates hinged together at D', the curvature of said plates being concentric with the surface of the tube B. These pairs of plates are set, as shown, between the portion C or inner tire and the tube B, with their hinged portions central or next the tread B'. These plates are made of aluminium and extend a little more than one-half the distance around the inner surface of the tube in order to protect all portions thereof which would ever come in contact with the road. These hinged aluminium plates are applied in position during the process of molding or casting the inner and outer tires C B together, and thus are held securely in the position indicated, the ends C' of the portion C uniting with the tube A, and small portions C'' of the inner tire C uniting the said tube between the pairs of aluminium plates, such pairs being set so that their edges are a trifle out of contact for this purpose. Thus it will be seen that the aluminium plates are held firmly in position, but that each of the plates constituting a pair can move with relation to the other on the pintle of the hinge connecting them. Furthermore, the aluminium plates are provided on their outer surfaces with numerous depressions or indentations E for the purpose below described. Preferably the inner tire C is made somewhat thicker at C''' in order to accommodate the hinges of the plates.

When my improved tire is in use, the protecting-plates D prevent tacks or other sharp objects from passing into the inner tire or portion C, thus puncturing the tire; and, moreover, if such an object as a tack punctures the outer tire and strikes one of the plates D, its point will slip into the nearest perforation E and thus be prevented from cutting or slashing the tire by slipping over the surface of the plate. When the tire is in use, it is not rendered rigid or unyielding by the application of the aluminium plates, because the plates of each pair are hinged on a line with the outer circumference of the tire, or, in other words, next the center of the tread, so that as the tire moves over the ground it can yield or flatten as well as if there were no plates within it, for the reason that as the tire rolls the hinges D' work or yield consecutively. The material of the protecting-plates being aluminium their weight is very slight.

Having thus fully described my invention, what I claim, and desire to secure by Letters Patent, is—

1. In a pneumatic tire, the outer tire or tube B; an inner tire or stiffening portion C; and a series of pairs of aluminium plates D, the plates of each pair being hinged together, and said pairs of plates being set side by side between the inner and outer tires with their hinges extending along the line of the center of the tread, and said outer tire, inner tire and plates being molded together, substantially as described.

2. In a pneumatic tire, the outer tire or tube B; an inner tire or stiffening portion C; and the series of pairs of aluminium plates D, the plates of each pair being hinged together, said pairs of plates being set side by side between the inner and outer tires with their hinges extending along the line of the center of the tread, said plates being provided with depressions E on their outer surfaces, and the outer tire, inner tire and plates being molded together, substantially as set forth.

JOSEPH A. ROUSSEAU.

Witnesses:
JOHN P. ROUSSEAU,
JOHN T. MARTIN.